(12) United States Patent
Huang

(10) Patent No.: US 9,002,169 B2
(45) Date of Patent: Apr. 7, 2015

(54) OPTICAL FIBER FIXING DEVICE

(71) Applicant: Hon Hai Precision Industry Co., Ltd., New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1 day.

(21) Appl. No.: 13/848,729

(22) Filed: Mar. 22, 2013

(65) Prior Publication Data

US 2014/0086546 A1 Mar. 27, 2014

(30) Foreign Application Priority Data

Sep. 27, 2012 (TW) .............................. 101135442 A

(51) Int. Cl.
*G02B 6/00* (2006.01)
*G02B 6/44* (2006.01)
*G02B 6/36* (2006.01)

(52) U.S. Cl.
CPC ............ *G02B 6/4471* (2013.01); *G02B 6/3616* (2013.01); *G02B 6/3636* (2013.01)

(58) Field of Classification Search
CPC ... G02B 6/3616; G02B 6/3636; G02B 6/4471

USPC .......................................................... 385/137
See application file for complete search history.

(56) References Cited

U.S. PATENT DOCUMENTS

| 4,750,804 A * | 6/1988 | Osaka et al. ..................... 385/55 |
| 5,717,813 A * | 2/1998 | Harman et al. ................ 385/147 |
| 2004/0022484 A1* | 2/2004 | Sigloch et al. .................. 385/22 |

\* cited by examiner

*Primary Examiner* — Omar R Rojas
(74) *Attorney, Agent, or Firm* — Novak Druce Connolly Bove + Quigg LLP

(57) ABSTRACT

An optical fiber fixing device includes a substrate, a cover, a locking assembly, and a fixing plate. The substrate has a loading surface. A number of poles are positioned on the loading surface. Every two adjacent poles cooperate to form a receiving groove. The cover is rotatably connected to one end of the substrate. The fixing plate is positioned on the cover, and has a main body and a number of abutting portions extending from the main body. The abutting portions are corresponding to the receiving grooves respectively. Each abutting portion has two opposite abutting surfaces inclined with respect to the loading surface. Each abutting surface faces one of the poles, and thus the two abutting surface of each abutting portion cooperate with two corresponding poles and the loading surface to fix two optical fibers in the corresponding receiving groove.

7 Claims, 1 Drawing Sheet

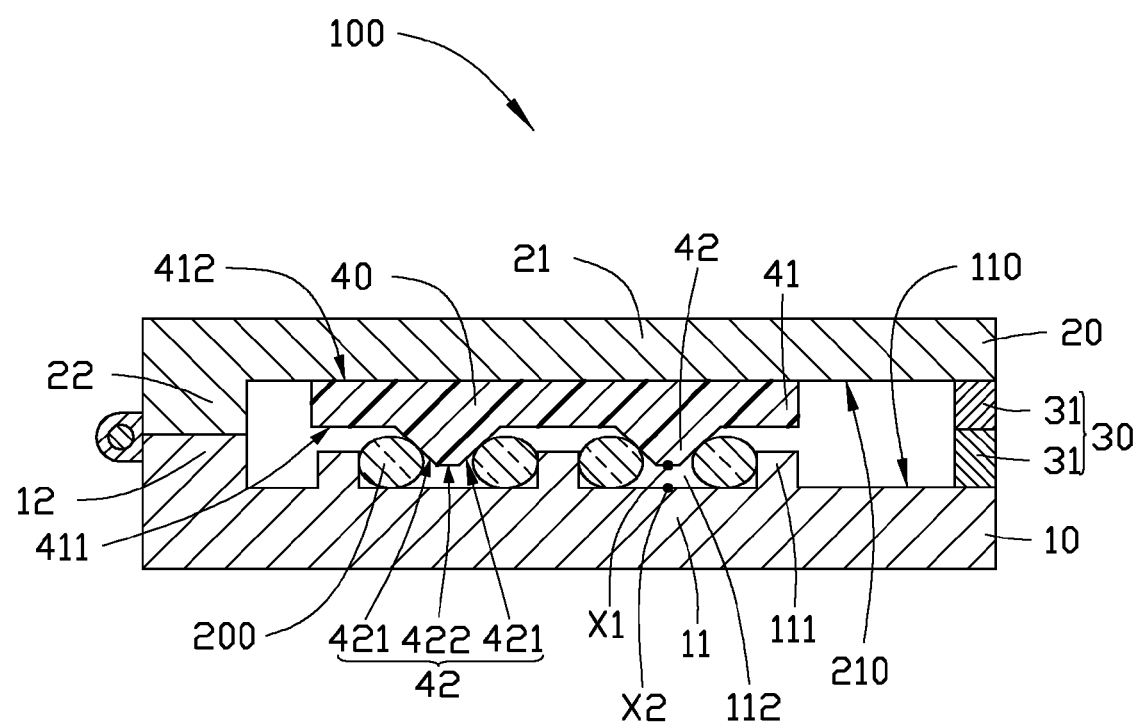

OPTICAL FIBER FIXING DEVICE

BACKGROUND

1. Technical Field

The present disclosure relates to fixing devices, and particularly to an optical fiber fixing device.

2. Description of Related Art

Currently, an optical fiber fixing device can fix only one optical fiber at a time, then the optical fiber fixing device is mounted on a detecting machine to detect the optical performance of the optical fiber. However, when a number of optical fibers need to be detected, the optical fiber fixing device must be detached from the detecting machine many times, which will reduce the detecting efficiency.

Therefore, it is desirable to provide an optical fiber fixing device that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

The FIGURE is a cross-sectional view of an optical fiber fixing device, according to an exemplary embodiment.

DETAILED DESCRIPTION

The FIGURE illustrates an optical fiber fixing device 100 in accordance to an embodiment. The optical fiber fixing device 100 is used for fixing a number of optical fibers 200 at one time. The optical fiber fixing device 100 includes a substrate 10, a cover 20, a locking assembly 30, and a fixing plate 40.

The substrate 10 is substantially L-shaped, and includes a first loading portion 11 and a first connecting portion 12 perpendicularly connected to the first loading portion 11. The first loading portion 11 includes a loading surface 110. A number of poles 111 are positioned on the loading surface 110, and are evenly spaced apart from each other. A receiving groove 112 is formed between every two adjacent poles 111. In this embodiment, the poles 111 are integrally formed with the first loading portion 11, the poles 111 are substantially cubic, and the lengthwise directions of the poles 111 are parallel to each other.

The cover 20 is substantially L-shaped, and includes a second loading portion 21 and a second connecting portion 22 perpendicularly connected to the second loading portion 21. The second connecting portion 22 is aligned with the first connecting portion 12, and is rotatably (such as pivotably) connected to the first connecting portion 12. The second loading portion 21 has a fixing surface 210 facing the loading surface 110.

The locking assembly 30 is used for locking the substrate 10 and the cover 20, and includes two magnetic elements 31 (such as magnets) attracted to each other. One of the two magnetic elements 31 is fixed to the substrate 10, and the other one of the two magnetic elements 31 is fixed to the cover 20. The two magnetic elements 31 are aligned with each other, thus the cover 20 and the substrate 10 are locked with each other. In another embodiment, the substrate 10 and the cover 20 are made of iron, and thus both of the substrate 10 and the cover 20 can be attracted to the magnetic elements 31, therefore, the number of the magnetic elements 31 can be only one. In still another embodiment, the substrate 10 and the cover 20 can be locked with each other using other locking manner.

The fixing plate 40 is fixed to the fixing surface 210, and is coupled with the poles 111 to fix the optical fibers 200. The fixing plate 40 includes a main body 41 and a number of abutting portions 42 extending from the main body 41. The main body 41 includes a first surface 411 and a second surface 412 opposite to the first surface 411. The first surface 411 and the second surface 412 are parallel to each other. The first surface 411 faces the loading surface 110, and is parallel to the loading surface 110. The abutting portions 42 extend from the first surface 411. The second surface 412 is fixed to the fixing surface 210. The abutting portions 42 correspond to the receiving grooves 112 respectively. Each abutting portion 42 includes two abutting surfaces 421 and a connecting surface 422 connected to the two abutting surfaces 421. The connecting surface 422 is parallel to the first surface 411. The two abutting surfaces 421 are opposite to each other, and are inclined with respect to the loading surface 110. The abutting surfaces 421 of each abutting portion 42 are symmetric with each other about a symmetric axis X1. The receiving groove 112 has a center axis X2 extending along a lengthwise direction of the corresponding pole 111. A projection of the symmetric axis X1 on the loading surface 110 is coincided with a central axis X2 of the corresponding receiving groove 112.

Each abutting surface 421 faces one of the poles 111 of the corresponding receiving groove 112, and thus the two abutting surfaces 421 are cooperated with the corresponding poles 111 and the loading surface 110 to respectively fix two optical fibers 200. In this embodiment, an included angle formed between each abutting surface 421 and the loading surface 110 is about 45 degrees, an included angle formed between each abutting surface 421 and the connecting surface 422 is about 135 degrees, the two abutting surfaces 421 are directly connected to the first surface 411, and an included angle formed between each abutting surface 421 and the first surface 411 is about 135 degrees. The fixing plate 40 is made of plastic, and the main body 41 is integrally formed with the abutting portions 42.

In use, the cover 20 and the substrate 10 are separated with each other, then each receiving groove 112 receives two optical fibers 200, and the two optical fibers 200 are respectively adjacent to the corresponding two poles 111. Then the cover 20 is locked with the substrate 10 via the magnetic elements 31, and thus each abutting portion 42 cooperates with the corresponding receiving groove 112 and the corresponding poles 111 to fix the two optical fibers 200. The optical fiber fixing device 100 and the optical fibers 200 can be moved to detect the optical performance of the optical fibers 200.

By employing the optical fiber fixing device 100, each abutting portion 42 can cooperate with the corresponding receiving groove 112 the corresponding poles 111 to fix two optical fibers 200, therefore, the abutting portions 42 and the receiving grooves 112 can cooperate to fix a number of optical fibers 200. Therefore, the detecting efficiency is improved.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical fiber fixing device for fixing a plurality of optical fibers, comprising:

a substrate having a loading surface, wherein a plurality of poles are positioned on the loading surface and are evenly spaced apart from each other, each two adjacent poles cooperate to form a receiving groove therebetween, the receiving groove is configured for receiving two of the optical fibers;

a cover rotatably connected to one end of the substrate;

a locking assembly for locking the cover and the substrate; and a fixing plate extending from the cover and facing the substrate, wherein the fixing plate comprises a main body and a plurality of abutting portions each corresponding to a receiving groove, each of the abutting portions comprises two opposite abutting surfaces, the abutting surfaces are inclined with respect to the loading surface, each of the abutting surfaces faces a respective one of the poles, and thus the two abutting surfaces of each of the abutting portions cooperate with the respective poles and the loading surface to fix two of the optical fibers in the corresponding receiving groove;

wherein an included angle formed between each abutting surface and the loading surface is about 45 degrees, each of the abutting portions comprises a connecting surface connected to its two abutting surfaces, the connecting surface is opposite to the loading surface, and an included angle formed between each abutting surface and the connecting surface is about 135 degrees.

2. The optical fiber fixing device of claim 1, wherein the two abutting surfaces of each of the abutting portions are symmetric with each other about a symmetric axis, each receiving groove has a center axis extending along a lengthwise direction of the poles, and a projection of the symmetric axis on the loading surface is coincided with the center axis of the corresponding receiving groove.

3. The optical fiber fixing device of claim 1, wherein the fixing plate is made of plastic, and the main body is integrally formed with the abutting portions.

4. The optical fiber fixing device of claim 1, wherein the main body comprises a first surface and a second surface opposite to the first surface, the first surface faces the loading surface, the abutting portions are positioned on the first surface, the two abutting surfaces of each of the abutting portions are connected to the first surface, and the second surface is fixed to the cover.

5. The optical fiber fixing device of claim 4, wherein the first surface is parallel to the loading surface, and an included angle formed between each abutting surface and the first surface is about 135 degrees.

6. The optical fiber fixing device of claim 1, wherein lengthwise directions of the poles are parallel to each other.

7. The optical fiber fixing device of claim 1, wherein the locking assembly comprises at least one magnetic element.

* * * * *